Figure 1:
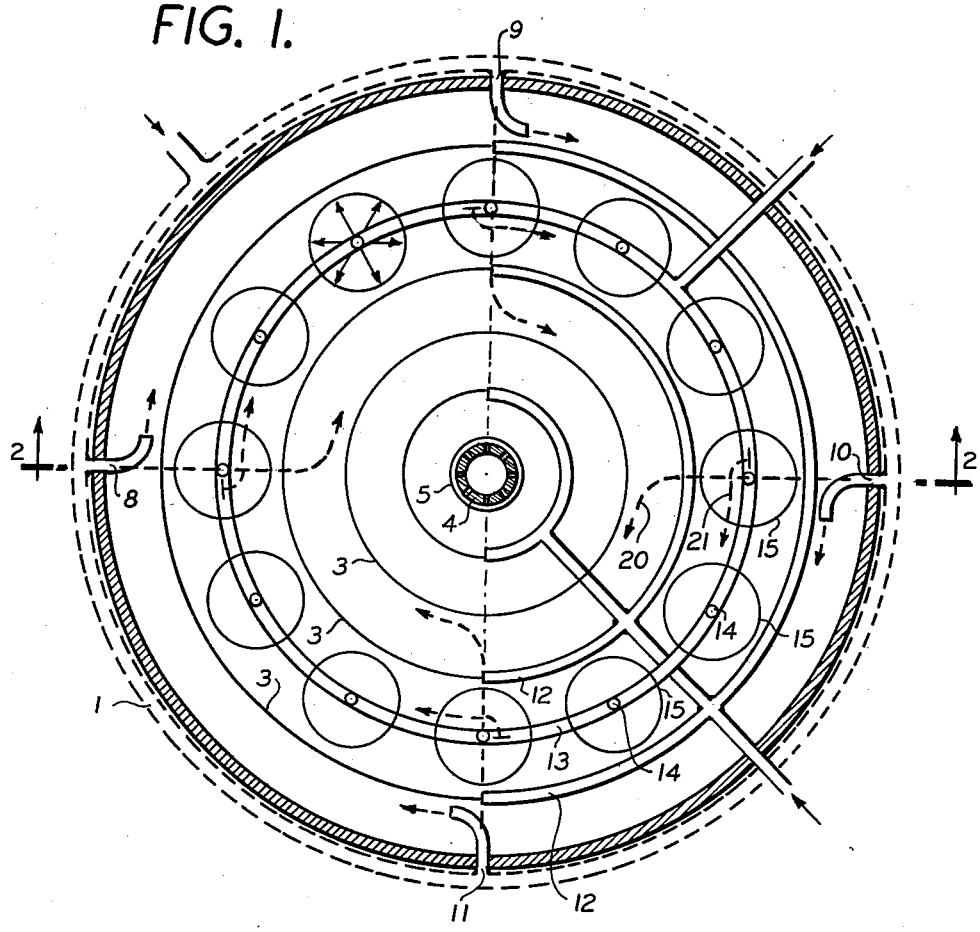

May 19, 1964 W. KOBER 3,133,878
APPARATUS FOR THE BIOLOGICAL TREATMENT OF WASTE WATERS
Filed Aug. 12, 1960 2 Sheets-Sheet 1

INVENTOR
WALTER KOBER
BY

DIAGRAMMATICAL ILLUSTRATION OF THE PROCEDURE OF FLOW

VERTICAL CIRCULATION BROUGHT ABOUT BY THE AERATING RINGS

CIRCULAR FLOW BROUGHT ABOUT BY TANGENTIAL FEED. (RESULTING SPIRALS)

INVENTOR
WALTER KOBER

United States Patent Office 3,133,878
Patented May 19, 1964

3,133,878
APPARATUS FOR THE BIOLOGICAL TREATMENT OF WASTE WATERS
Walter Kober, Lubeck-Herrenwyk, Germany, assignor to Metallhuttenwerke Lubeck G.m.b.H., Lubeck-Herrenwyk, Germany
Filed Aug. 12, 1960, Ser. No. 49,349
7 Claims. (Cl. 210—220)

The present invention provides a process and installation for the biological treatment of waste water by means of activated sludge and aeration with compressed air.

The principle of the biological purification of waste water by means of aerobic bacteria is known. The addition of the requisite oxygen and the circulation of the water are commonly carried out by injecting compressed air into the waste water mixed with activated sludge with the aid of paddles or brushes or by sluice-like devices and eddies.

The flow is usually produced in long rectangular vats, or in oval or round channels or trenches, with the aid of aeration devices or rotating brushes disposed close to the horizontal bottom. Furthermore, it is known to effect circulation in radial planes by providing in a round vat a central cylindrical channel in which there is disposed an impeller having a vertical spindle so that the waste water is conveyed upwardly in the central channel, the air being supplied through an aeration device with partially perforated walls which is located below the liquid level in the vat. Furthermore, it is known to provide rotating air discharge means on the bottom of a vat, while at the same time means are provided to convey the sediments to a sump.

It is also known to use several separate vats for the purification of waste water with activated sludge by several operations such, for example, as pre-purification, biological main purification, after-purification, and regeneration of sludge. It is also known to subdivide round vats by means of partitions into sections used for different functional stages; in this case the direction of flow always points radially outwards from the centre of the vat. The known processes and installations have the disadvantage that, notwithstanding their size and complexity, their decontamination performance is relatively poor because with the conventional arrangement in series of several independent vats the transition from one biological stage to the next gives rise to abrupt changes in the charge, which impair the decontaminating efficiency of the activated sludge. In addition, with the known installations, if periodically irregular amounts of waste water are to be treated additional compensating vats are required to ensure a consistent clarification effect. Furthermore, most of the installations described above require very much space.

An object of the present invention is to provide a biological purification process by means of which a better purification effect is achieved with a minimum of space and cost and a high degree of operational reliability.

A further object is to provide an installation in which such a process can be carried out. Other objects will appear hereinafter.

The process of the invention comprises introducing return water and sludge tangentially into the peripheral zone of a round vat and thereby setting up a spiral flow in the vat towards its centre, maintaining said spiral flow through an intermediate annular zone and a central zone of the vat, discharging liquid from the centre of the vat, adding waste water to be purified to the said intermediate zone and introducing compressed air into the spirally flowing liquid in the vat.

The invention includes also an installation for carrying out the above process, comprising a round vat without partitions, having a substantially horizontal bottom and provided with aeration devices located above the bottom of the vat, a central discharge device for the treated waste water, and distributed over the bottom of the vat concentric annular ridges, a distributing device for introducing waste water into the vat in an annular charging zone between the central and peripheral zones of the vat, and along the periphery of the vat supply pipes for introducing return water and return sludge tangentially into the peripheral annular zone and, if necessary, into the central zone.

If necessary the installation may also comprise supply pipes for introducing sludge tangentially into the central zone of the vat.

It is of advantage to provide aeration ducts above alternate annular ridges. The discharge device is preferably designed as a discharge pipe in the centre of the vat in which there are provided longitudinal slots of different length which can be adjustably closed by means of a sleeve-type tubular slide.

The return water and the return sludge may be introduced in different sectors of the vat in the vicinity of the periphery, for example at a distance of 1 metre therefrom, through pipes the open ends of which are bent, all in the same direction, tangentially to the wall of the vat. The return sludge and return water flowing out of these pipes produce at first a flow along the periphery of the vat. The peripheral annular zone charged with return water and return sludge serves essentially to effect the regeneration of the sludge.

In a variant of the process which is particularly advantageous, especially when treating considerably polluted industrial waste water, the waste water is evenly distributed by spraying from above over the intermediate annular area, i.e. the charging zone; this spraying causes volatile contaminants to escape from the water, oxygen to be absorbed from the air, and roughening up of the surface of the water by the falling droplets so that additional aeration is achieved.

The present process produces in addition to the circulating and turbulent flow a substantially horizontal spiral flow which by virtue of the shape of the vat and the manner of supplying the waste water to be treated is made up of a first component directed radially towards the discharge device in the centre of the vat, and a second component, resulting from the returning materials, acting in the tangential direction. The resulting spiral flow creates a very long path, covering a multiple of the circumference of the vat, so that there is abundant opportunity for the activated sludge to act on the contaminants. Also, the transitions from one stage to the next are continuous and gradual, so that abrupt changes in the load on the biological purification medium are prevented. The distribution of the supply of waste water over the whole surface of the charging zone at the same time ensures a completely even load on the activated sludge. It is also possible to adapt the process to special prevailing conditions by varying the distribution of the surface between the individual functional zones. Quantitative and qualitative irregularities in the supply can be equalized to a valuable extent without using a preliminary compensating vat by suitably adjusting the level in the vat by means of the discharge device, and in this manner overload on the settling vat, which would cause a turbid discharge, is prevented.

The very substantially improved purification effect is achieved with the use of a single vat which, owing to its round shape, low overall height, absence of partitions and simple strengthening of the plane bottom is easier and cheaper to manufacture than any known aeration installation assembled from several different and rectangular structural units or a round vat provided with complicated partitions or the like. Over and above this the surface of the water roughened up by the impinging droplets, which surface is large in relation to the volume of the vat, that is to say to the aeration space, in conjunction with the rapid rotation of the water owing to the flatness of the vat, increases the aeration affect, so that considerably less compressed air is required.

Over and above this, it is of essential importance that all flow phenomena are produced exclusively by the natural direction of flow towards the discharge pipe, by the aeration which is necessary anyway and by the tangential inflow of the water, no special machinery being required. This reduces the operational costs and gives the process high operational reliability.

Figure 2:
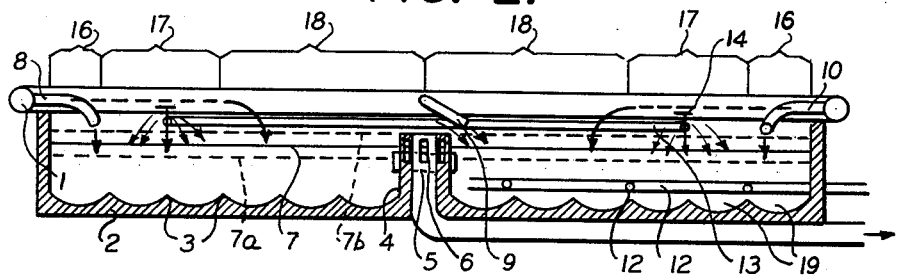
Figure 3:
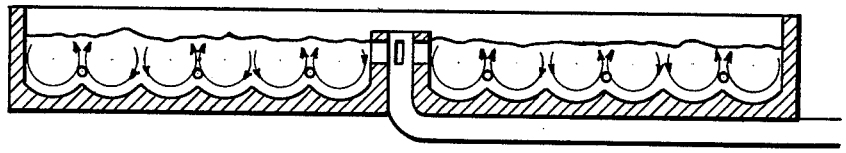
Figure 3:
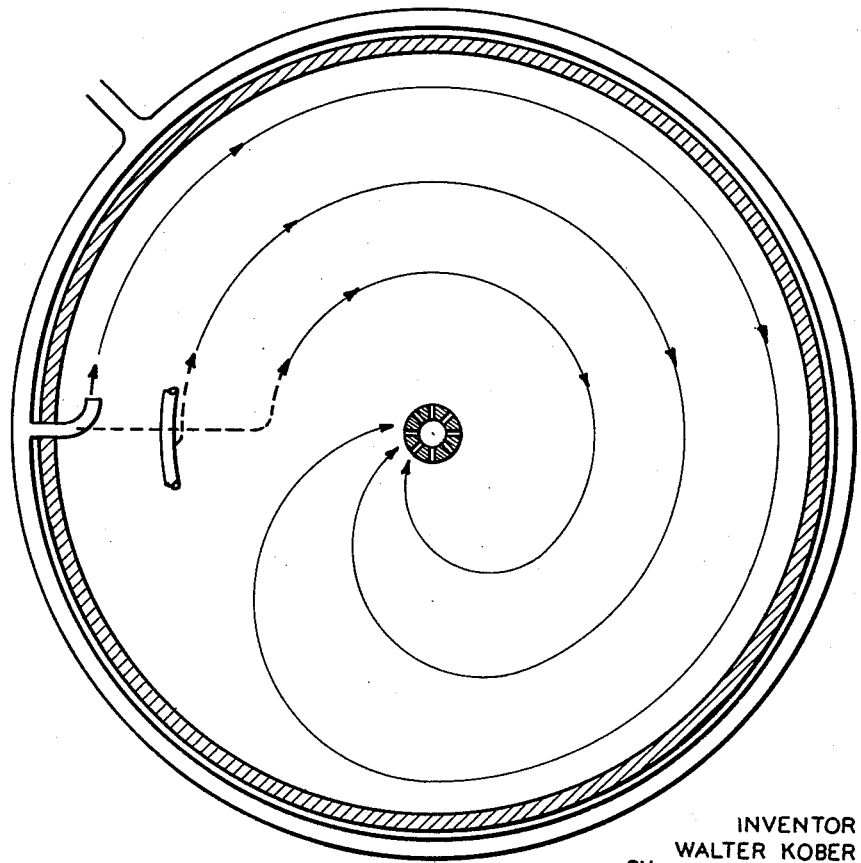

An installation in accordance with the invention is illustrated in the accompanying drawing, in which:

FIG. 1 is a plan view of the vat, some features being shown only in the righthand half of the drawing, and FIG. 2 is a sectional elevation of the vat along the line 2—2 of FIG. 1.

Referring now to the drawing, 1 is the cylindrical wall of the vat, which surrounds the flat bottom 2. On its upper surface this vat bottom has annular ridges 3 which are disposed equidistantly from one another and concentrically with respect to the wall 1. Between the ridges the bottom of the vat is indented. In the particular embodiment shown in the drawing the bottom has seven concentric ridges 3.

In the centre of the vat there is provided a tubular discharge device 4, the upper open end of which is slightly below the level of the top of the wall 1 but above the normal water level indicated by the line 7. The outer shell of the discharge device 4 has slots 6, and the amount of water passed by these slots can be regulated by a sleeve-type tubular slide 5 in a manner such that the water level can be set, for example between the lines 7a and 7b, as required to absorb and compensate for any possible irregular, abrupt changes in the load.

Above the wall 1 of the vat the supply ducts for the return water and return sludge are arranged equidistantly along the peripheral zone 16 and the central zone 18. In the embodiment illustrated there are eight such supply ducts 8, 9, 10 and 11, along the peripheral zone 16 and corresponding to each duct along the peripheral zone, 4 ducts 20 along the central zone 18.

The supply ducts are angled in a manner such that the materials supplied flow in the same direction tangentially to the periphery of the vat. Thus in the embodiment illustrated the material is caused to circulate in the clockwise direction.

Over the edge of each alternating annular ridge 3 there runs an annular aeration duct 12. Each of the aeration ducts thus serves two annular depressions 19, forming a double aeration system. On the underside of the aeration ducts there are provided in known manner aeration orifices of a diameter of, for example, 2 to 3 mm., at intervals of, for example, 150 to 250 mm.

In the embodiment illustrated, in which the vat comprises seven concentric annular ridges, aeration ducts are provided over the edges of the outermost and innermost annular ridges as well as over the edges of the 3rd and 5th annular ridges.

The waste water is supplied to the installation through a duct 13 disposed above the vat by spraying it evenly through spray heads 14 equally spaced along the periphery or, for example, through a series of distributing gutters. The whole is arranged in a manner such that the waste water is distributed by spray circles 15 or in any other suitable manner over an annular area corresponding to about 50% of the vat bottom.

By the manner and location of the points of supply of the waste water and the sludge respectively the vat is subdivided into three functional annular zones shown in FIG. 2.

The zone marked 16 is located immediately besides the wall 1 of the vat and takes up about 25% of the total vat area. This zone is supplied with return sludge and return water through the pipes 8, 9, 10 and 11 and is used as a sludge regeneration zone. In this zone the sludge is not charged with waste water.

Zone 17 is the main charging zone; it takes up about 50% of the total vat area, and is covered all over with waste water by means of the spraying device and, if desired, additionally also by means of distributing pipes. So far as the purification is concerned this zone may be referred to as the first biological stage. Zone 18, located towards the centre of the vat, is the so-called follow-up purification zone which, like the regenerating zone, covers about 25% of the total vat area. No waste water is introduced into this zone, but if required sludge may be added here. In this zone the after-purification takes place, and this zone is accordingly referred to as the second biological stage. From this zone the biologically purified sludge water is withdrawn through the discharge device 4 and supplied to the settling vat (not shown in the drawing). In this connection stress is laid on the fact that the three functional zones are not separated by partitions from one another.

In one example of the installation the cylindrical wall 1 of the vat has a height of about 2.50 metres. The diameter of the vat is governed by the size of the requisite aeration space which in turn depends on the specific decontamination performance required and on the throughput of waste water. The normal water level in the vat is about 1.80 metres and is set by adjusting the slots 6 for a normal throughput, for example to the level of line 7. When the water level is raised to the exposed outflow indicated by line 7b, of the discharge device 4, a variable increase in the volume of the aeration vat is achieved so that temporary load surges can be qualitatively and quantitatively absorbed to some extent, whereby the discharge rate is balanced and the settling vat can be relieved. This possibility of special advantage when periodically varying quantities of waste water have to be treated. The minimum and maximum levels in the example shown are about 1.60 and 2.20 metres respectively, which means that the effective volume of the vat can be varied by about 33%.

At a purification efficiency of 97% the process of the invention achieves a decontamination performance of over 16 kg. $BSB_5/m.^3$ aeration space per day, so that it is far superior to the known high-efficiency processes which have a purification effect of 60 to 70% and a decontamination performance of up to 4 kg. of $BSB_5/m.^3$ and often require an after-purification step in view of the poor degree of purification achieved. In addition, the amount of aeration needed (about 15 m.$^3$ per kg. $BSB_5$) is lower by about 50% than in the hitherto known and practised aeration processes.

Compared with the known vats the round vat of the present invention is of simpler design and comprises no partitions so that it is easier and cheaper to manufacture. Furthermore, the increase in performance per cubic metre of aeration space achievable with the present round aeration vat enables the volume of the structure to be considerably reduced. In addition, the specific increase in performance in general and the low consumption of compressed air associated with the present process lead to considerable savings in running expenses.

I claim:

1. An installation for the biological treatment of waste water, which essentially comprises a round vat being free from partition and having a substantially horizontal bottom provided with concentric annular ridges; supply pipes for tangentially introducing return water and return sludge into the outer peripheral zone of the vat; an aeration device located above the bottom of the vat; a distributing device for introducing waste water into the vat in an annular charging zone adjoining the central zone and the peripheral zone of the vat; a distributing device for introducing sludge into the central zone, in the direction of flow of the liquid therein; and a central discharge device in the vat for the treated waste water.

2. An installation according to claim 1, wherein the waste water distributing device is a spray located above the intermediate annular zone of the vat for spraying waste water directly on the water surface in said intermediate zone.

3. An installation according to claim 2, wherein the aeration devices consist of annular perforated ducts arranged over alternating annular ridges.

4. An installation according to claim 2, wherein the discharge device is a vertical discharge pipe open at the top and having in its wall longitudinal slots which can be closed to any desired degree by means of an adjustable sleeve.

5. An installation according to claim 4, comprising annular perforated ducts located above alternate annular ridges.

6. An installation for the biological treatment of waste water which essentially comprises a round vat being free from partitions, for receiving waste water to be purified and liquids used in this purification; said vat having a substantially horizontal bottom provided with concentric annular ridges; a vertical discharge pipe situated at the centre of the vat, open at the top and having in its wall longitudinal slots, which can be closed to any desired degree by means of an adjustable sleeve; annular perforated ducts concentric with the vat for the introduction of compressed air above the bottom of the vat, but below the normal operating water level for aeration of the liquid to be purified; a distributing device located above an intermediate annular zone of the vat, located between a central and a peripheral zone of the vat and supply means leading tangentially into the vat in positions towards the periphery of the vat.

7. An installation according to claim 6, comprising also supply means for introducing sludge tangentially into the central zone of the vat.

References Cited in the file of this patent

UNITED STATES PATENTS

| | | |
|---|---|---|
| 83,430 | Winans et al. | Oct. 27, 1868 |
| 1,734,011 | Harrison | Feb. 25, 1926 |
| 2,024,986 | Durdin | May 5, 1932 |
| 2,212,841 | Maxwell | Aug. 27, 1940 |
| 2,901,114 | Smith et al. | Aug. 25, 1959 |
| 2,969,225 | Jenks | Jan. 24, 1961 |

FOREIGN PATENTS

| | | |
|---|---|---|
| 17,463 | Great Britain | of 1915 |
| 571,434 | Germany | Mar. 2, 1933 |
| 796,438 | Great Britain | June 11, 1958 |
| 203,422 | Australia | May 11, 1959 |